US 8,079,658 B2

(12) United States Patent
Ikeda et al.

(10) Patent No.: US 8,079,658 B2
(45) Date of Patent: Dec. 20, 2011

(54) PRINT DENSITY ADJUSTING DEVICE, PRINT DENSITY ADJUSTING METHOD AND PRINT DENSITY ADJUSTING PROGRAM

(75) Inventors: Akira Ikeda, Tomi (JP); Yutaka Miyasaka, Tomi (JP); Satoshi Takezawa, Tomi (JP); Masakatsu Okawa, Tomi (JP)

(73) Assignee: Mimaki Engineering Co., Ltd., Nagano (JP)

( * ) Notice: Subject to any disclaimer, the term of this patent is extended or adjusted under 35 U.S.C. 154(b) by 0 days.

(21) Appl. No.: 12/900,786

(22) Filed: Oct. 8, 2010

(65) Prior Publication Data

US 2011/0074853 A1 Mar. 31, 2011

Related U.S. Application Data

(63) Continuation of application No. PCT/JP2009/069620, filed on Nov. 19, 2009.

(30) Foreign Application Priority Data

Nov. 21, 2008 (JP) ................... 2008-298239

(51) Int. Cl.
*B41J 29/38* (2006.01)
(52) U.S. Cl. ............... 347/14; 347/19; 358/1.2
(58) Field of Classification Search ............... 347/14, 347/19; 358/1.2
See application file for complete search history.

(56) References Cited

U.S. PATENT DOCUMENTS 6,330,019 B1 * 12/2001 Kubokawa .......... 347/241
6,862,111 B2 * 3/2005 Lin et al. ............. 358/1.9

FOREIGN PATENT DOCUMENTS

| JP | 9-193368 | 7/1997 |
| JP | 2001-179858 | 7/2001 |
| JP | 2006-209427 | 8/2006 |
| JP | 2008-126505 | 6/2008 |
| JP | 2008-310123 | 12/2008 |

OTHER PUBLICATIONS

International Search Report for International Application No. PCT/JP2009/069620, Dec. 15, 2009.

* cited by examiner

*Primary Examiner* — Laura Martin
(74) *Attorney, Agent, or Firm* — Ditthavong Mori & Steiner, P.C.

(57) ABSTRACT

A print density adjusting device of print image information includes a print image information acquirer configured to acquire the print image information. A forming information acquirer is configured to acquire forming information of a medium on which an inkjet printer prints and which is to be bent. A vertex detector is configured to detect a vertex of a bent part which is to be bent based on the forming information. A bending angle detector is configured to detect a bending angle of the bent part based on the forming information. A print density adjuster is configured to adjust a print density of the print image information acquired by the print image information acquirer based on the vertex detected by the vertex detector and based on the bending angle detected by the bending angle detector.

11 Claims, 9 Drawing Sheets

Fig. 5

⟨Bent Part in Recessed Shape⟩

| Position | Density | Quantity of "C" (%) | Quantity of "M" (%) | Quantity of "Y" (%) |
|---|---|---|---|---|
| d | 100% | 20 | 30 | 50 |
| c | 80% | 16 | 24 | 40 |
| b | 60% | 12 | 18 | 30 |
| a | 40% | 8 | 12 | 20 |

100% is Reference (Printing on Flat Face)

Fig. 6

<Bent Part in Projected Shape>

| Position | Density | Quantity of "C" (%) | Quantity of "M" (%) | Quantity of "Y" (%) |
|---|---|---|---|---|
| d | 100% | 20 | 30 | 50 |
| c | 120% | 24 | 36 | 60 |
| b | 140% | 28 | 42 | 70 |
| a | 160% | 32 | 48 | 80 |

100% is Reference (Printing on Flat Face)

PRINT DENSITY ADJUSTING DEVICE, PRINT DENSITY ADJUSTING METHOD AND PRINT DENSITY ADJUSTING PROGRAM

CROSS-REFERENCE TO RELATED APPLICATIONS

The present application is a continuation application of International Application No. PCT/JP2009/069620, filed Nov. 19, 2009, which claims priority to Japanese Patent Application No. 2008-298239, filed Nov. 21, 2008. The contents of these applications are incorporated herein by reference in their entirety.

BACKGROUND OF THE INVENTION

1. Technical Field

The present invention relates to a print density adjusting device, a print density adjusting method, and a print density adjusting program.

2. Background Art

A membrane switch has been commonly utilized as a switch for an electric apparatus or the like. The membrane switch is formed so that, after a switch image or the like has been printed on a sheet-shaped film by an inkjet printer, the film is bent in a recessed and projected shape (see, for example, Japanese Patent Laid-Open No. Hei 09-193368 and Japanese Patent Laid-Open No. 2008-126505).

However, in a conventional inkjet printer, printing is performed only on a medium which has been already bent in a projected and recessed shape. Therefore, when printing is performed on a medium like a membrane switch which will be bent in a projected and recessed shape in a subsequent process, ink layer located on the bent portion is expanded or contracted and deteriorated by bending of the medium in the recessed and projected shape. In other words, in the bent part which is bent in a projected shape, the ink layer is expanded and thus its print density is lowered and a crack may be occurred in the ink layer. On the other hand, in the bent part which is bent in a recessed shape, the ink layer is contracted and thus the ink layer may be floated and separated.

SUMMARY OF THE INVENTION

According to one aspect of the present invention, a print density adjusting device of print image information includes a print image information acquirer, a forming information acquirer, a vertex detector, a bending angle detector, and a print density adjuster. The print image information acquirer is configured to acquire the print image information. The forming information acquirer is configured to acquire forming information of a medium on which an inkjet printer is to print and which is to be bent. The vertex detector is configured to detect a vertex of a bent part which is to be bent based on the forming information. The bending angle detector is configured to detect a bending angle of the bent part based on the forming information. The print density adjuster is configured to adjust a print density of the print image information acquired by the print image information acquirer based on the vertex detected by the vertex detector and based on the bending angle detected by the bending angle detector.

According to another aspect of the present invention, a print density adjusting method of print image information includes acquiring the print image information. Forming information of a medium on which an inkjet printer is to print and which is to be bent is acquired. A vertex of a bent part which is to be bent is detected based on the forming information. A bending angle of the bent part is detected based on the forming information. A print density of the print image information acquired in the print image information acquiring step is adjusted based on the vertex detected in the vertex detecting step and based on the bending angle detected in the bending angle detecting step.

According to the other aspect of the present invention, a print density adjusting program of print image information causes a computer to perform acquiring the print image information. Forming information of a medium on which an inkjet printer is to print and which is to be bent is acquired. A vertex of a bent part which is to be bent is detected based on the forming information. A bending angle of the bent part is detected based on the forming information. A print density of the print image information acquired in the print image information acquiring step is adjusted based on the vertex detected in the vertex detecting step and based on the bending angle detected in the bending angle detecting step.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 shows a print density setting table in a bent part which is formed in a recessed shape;

FIG. 6 is a print density setting table in a bent part which is formed in a projected shape;

DESCRIPTION OF THE EMBODIMENTS

A print density adjusting device, a print density adjusting method and a print density adjusting program in accordance with an embodiment of the present invention will be described in detail below with reference to the accompanying drawings. In the present embodiment, a print density adjusting device and a print density adjusting method the embodiment of the present invention are realized in an RIP (Raster Image Processor). An RIP in accordance with this embodiment is a processor in which a print density of print image data is adjusted for printing on a medium such as a membrane switch which will be bent in a projected and recessed shape in a subsequent process. A membrane switch is a well-known switch, which is structured so that a resin film or the like formed in a projected shape is disposed on a contact point. In all drawings, the same reference signs are used for the same portions or the corresponding portions.

Figure 1:
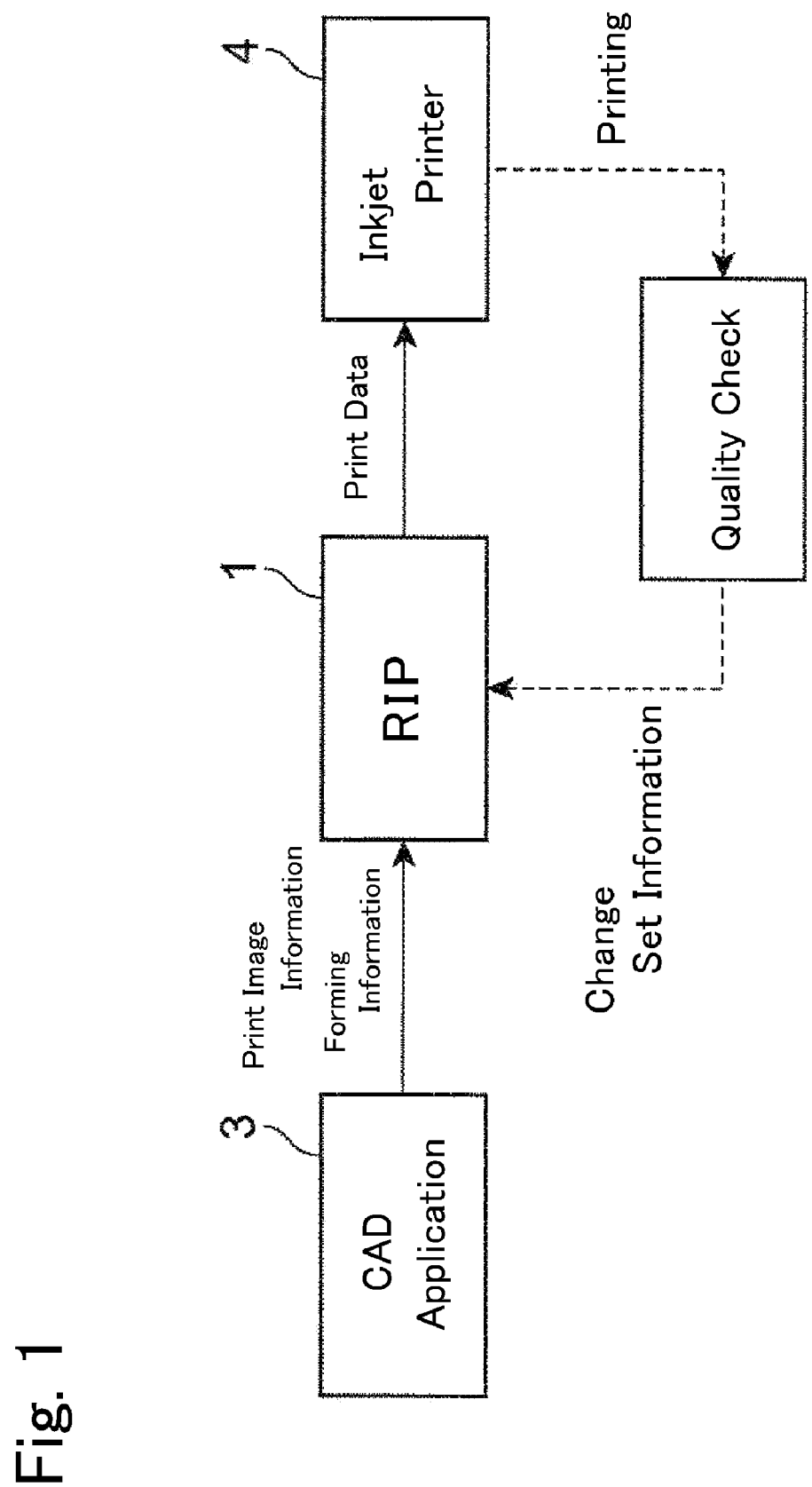
FIG. 1 is a view showing a printing system in which an RIP is used in accordance with an embodiment of the present invention.
Figure 2:
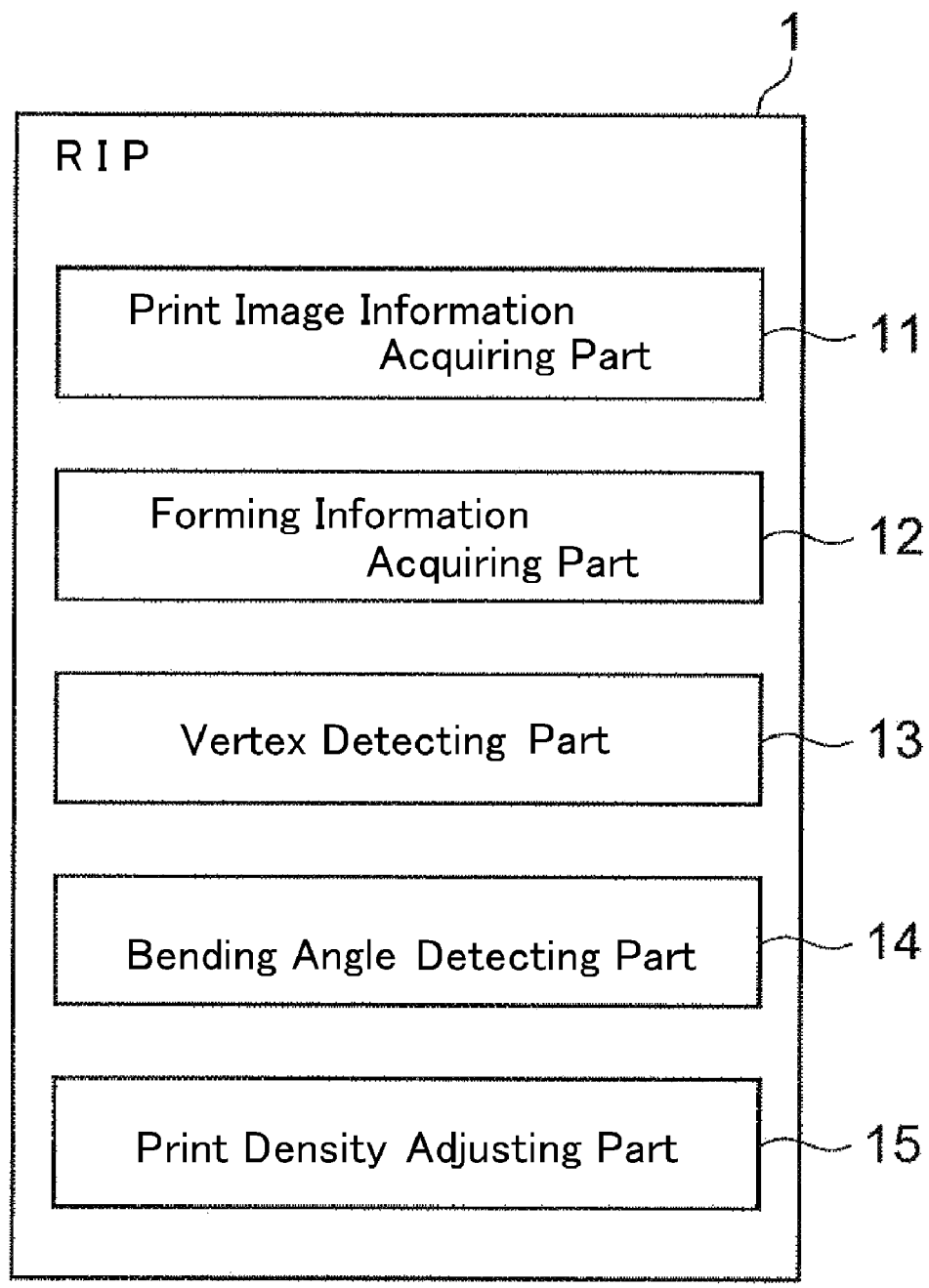
FIG. 2 is a function block diagram showing an RIP in accordance with an embodiment of the present invention.

FIG. 1 is a view showing a printing system in which an RIP in accordance with this embodiment is used, and FIG. 2 is a function block diagram of an RIP in accordance with this embodiment. As shown in FIG. 1, an RIP 1 in accordance with this embodiment is physically or logically connected with a CAD application 3 and an inkjet printer 4.

The CAD application 3 is a drawing application which is built in a personal computer or the like. The CAD application 3 prepares forming information for forming and bending a film and print image information for printing on the film. The forming information includes three-dimensional figure information, two-dimensional figure information or the like. In addition, the forming information includes a positional coordinate of a vertex of a bent part and a bending angle of the bent part as the information regarding to the bent part of the film. Further, the CAD application 3 transmits the forming information and the print image information which have been prepared to the RIP 1.

The inkjet printer 4 prints an image on the surface of the film as a print medium by means of that ink droplets of one or plural colors are ejected from an inkjet head not shown.

The RIP 1 acquires the forming information and the print image information transmitted from the CAD application 3 and performs the acquired print image information with density adjustment and the like to prepare print data, which are transmitted to the inkjet printer 4. In order to perform this operation, the RIP 1 is provided with functions of a print image information acquiring part 11, a forming information acquiring part 12, a vertex detecting part 13, a bending angle detecting part 14 and a print density adjusting part 15.

The print image information acquiring part 11 acquires print image information which is transmitted from the CAD application 3.

The forming information acquiring part 12 acquires forming information which is transmitted from the CAD application 3.

The vertex detecting part 13 detects a vertex of a bent part where the film is bent based on the forming information acquired in the forming information acquiring part 12. In other words, the vertex detecting part 13 searches for a bent part from a figure information when the forming information is a three-dimensional figure information and, when the forming information is a two-dimensional figure information, the vertex detecting part 13 searches for a bent part based on a bending information which has been added to the figure information or a bending line on a plane. The vertex detecting part 13 detects an angular part as a vertex when the searched bent part is bent in an angular shape and, when the searched bent part is bent in a curved shape, an arc center of the curved face is detected as a vertex.

The bending angle detecting part 14 detects a bending angle of a vertex which has been detected in the vertex detecting part 13 based on the forming information acquired in the forming information acquiring part 12. In other words, the bending angle detecting part 14 calculates a bending angle of the bent part based on the figure information when the forming information is a three-dimensional figure information and, when the forming information is a two-dimensional figure information, the bending angle detecting part 14 calculates a bending angle of the bent part based on a bending angle information or the like which has been added to the figure information.

Figure 3:
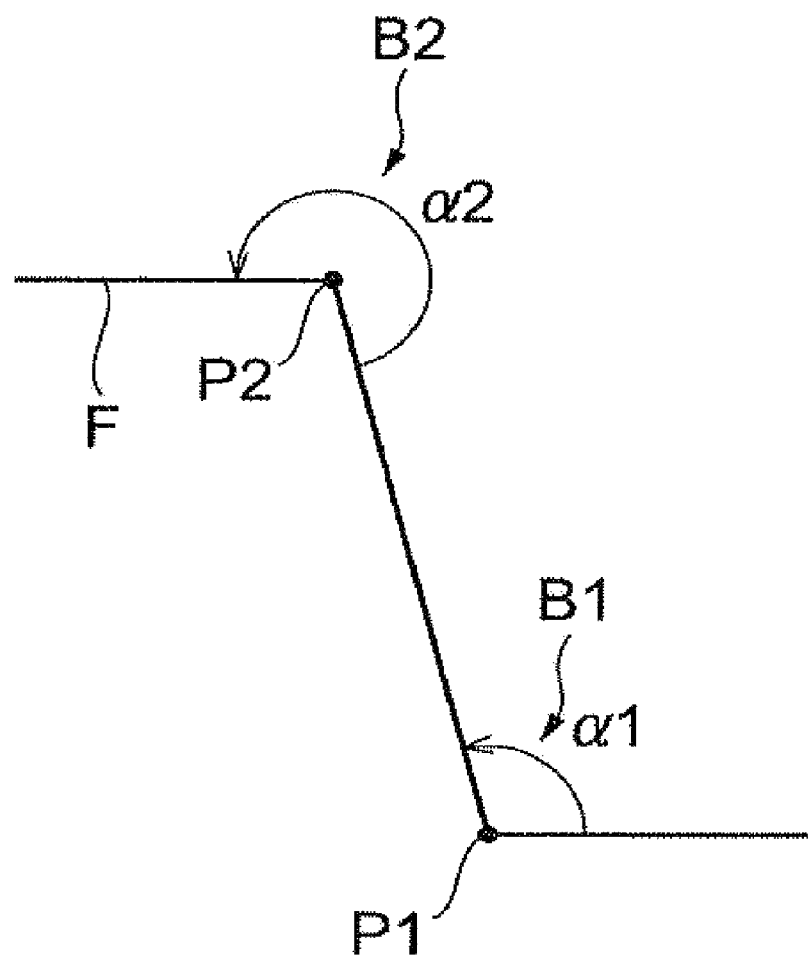
FIG. 3 is an explanatory view showing a vertex and a bending angle.

FIG. 3 is an explanatory view showing a vertex and a bending angle. As shown in FIG. 3, when a film "F" is to be bent at bent parts "B1" and "B2", the vertex detecting part 13 detects points "P1" and "P2" as vertexes. Further, the bending angle detecting part 14 detects angles "α1" and "α2" around the vertexes "P1" and "P2" as the bending angles of the bent parts "B1" and "B2". The bending angle "α1" of the bent part "B1" is smaller than 180° and thus the bent part "B1" is judged to be bent in a recessed shape and, since the bending angle "α2" of the bent part "B2" is larger than 180°, the bent part "B2" is judged to be bent in a projected shape.

The print density adjusting part 15 adjusts print density of the print image information which has been acquired in the print image information acquiring part 11 based on the vertex "P" detected in the vertex detecting part 13 and the bending angle "α" detected in the bending angle detecting part 14. In other words, the print density adjusting part 15 adjusts the print density of the print image information depending on a distance from the vertex "P" and the bending angle "α".

Figure 4:
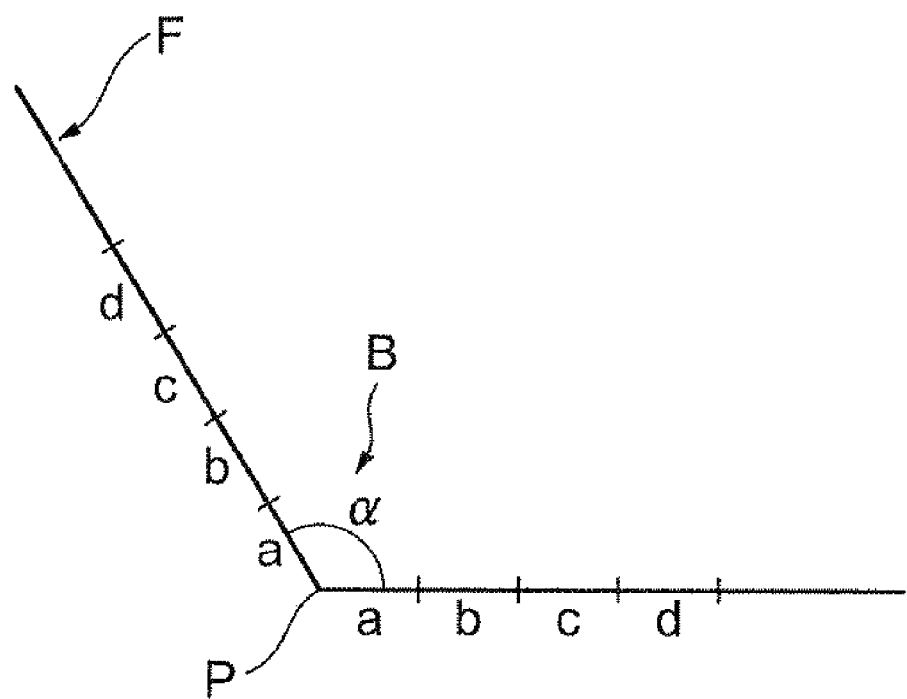
FIG. 4 is an explanatory view showing a distance from a vertex in a bent part.

FIG. 4 is an explanatory view showing a distance from the vertex in the bent part. In FIG. 4, the bent part "B" is bent with the bending angle "α" and with the vertex "P" as the center. Regions of "a", "b", "c" and "d" are set from the vertex "P" in this order and the regions approach to the vertex "P" in the order of "d", "c", "b" and "a". The print density adjusting part 15 sets the print density of the print image information lower toward the vertex "P" when the bent part "B" is bent in a recessed shape and, on the contrary, when the bent part "B" is bent in a projected shape, the print density of the print image information is set higher toward the vertex "P".

Specifically, the print density adjusting part 15 manages a print density setting table for setting the print density. FIG. 5 shows a print density setting table in a bent part which is formed in a recessed shape and FIG. 6 shows a print density setting table in a bent part which is formed in a projected shape. The print density setting tables shown in FIGS. 5 and 6 are tables in which a color printing with the use of cyan "C", magenta "M" and yellow "Y" is performed by the inkjet printer 4 and the total density and density ratios of the respective colors are set in the print density setting table. In this embodiment, a plurality of print density setting tables is provided for respective predetermined ranges of the bending angle "α".

The print density setting table shown in FIG. 5 is correspondent to the bent part "B" formed in a recessed shape and thus the densities are set so as lower toward the vertex "P". In other words, the total density is lowered as 100%→80%→60%→40% in the order from the positions "d" through "a". Further, the inks of respective colors are set toward the vertex "P" so that the cyan "C" is lowered as 20%→16%→12%→8%, the magenta "M" is lowered as 30%→24%→18%→12%, and the yellow "Y" is lowered as 50%→40%→30%→20%.

On the other hand, the print density table shown in FIG. 6 is correspondent to the bent part "B" formed in a projected shape and thus the densities are set so as higher toward the vertex "P". In other words, the total density is set higher as 100%→120%→140%→160% in the order from the positions "d" through "a". Further, the inks of respective colors are set toward the vertex "P" so that the cyan "C" is set higher as 20%→24%→28%→32%, the magenta "M" is set higher as 30%→36%→42%→48%, and the yellow "Y" is set higher as 50%→60%→70%→80%.

The total densities and the density ratios of the inks of the respective colors shown in FIGS. 5 and 6 are only examples and may be appropriately set depending on the kinds of ink and various conditions. Further, the print density setting table is also capable of being appropriately changed through an operation of an operator or the like.

The print density adjusting part 15 refers to the print density setting tables shown in FIGS. 5 and 6 and changes the print density of the print image information to a print density based on the bending angle "α" of the bent part "B" and the distance from the vertex "P". In other words, the print density adjusting part 15 changes ejection density of ink droplets ejected from the inkjet printer 4 and adjusts the print density to prepare print data which are transmitted to the inkjet printer 4.

Figure 7:
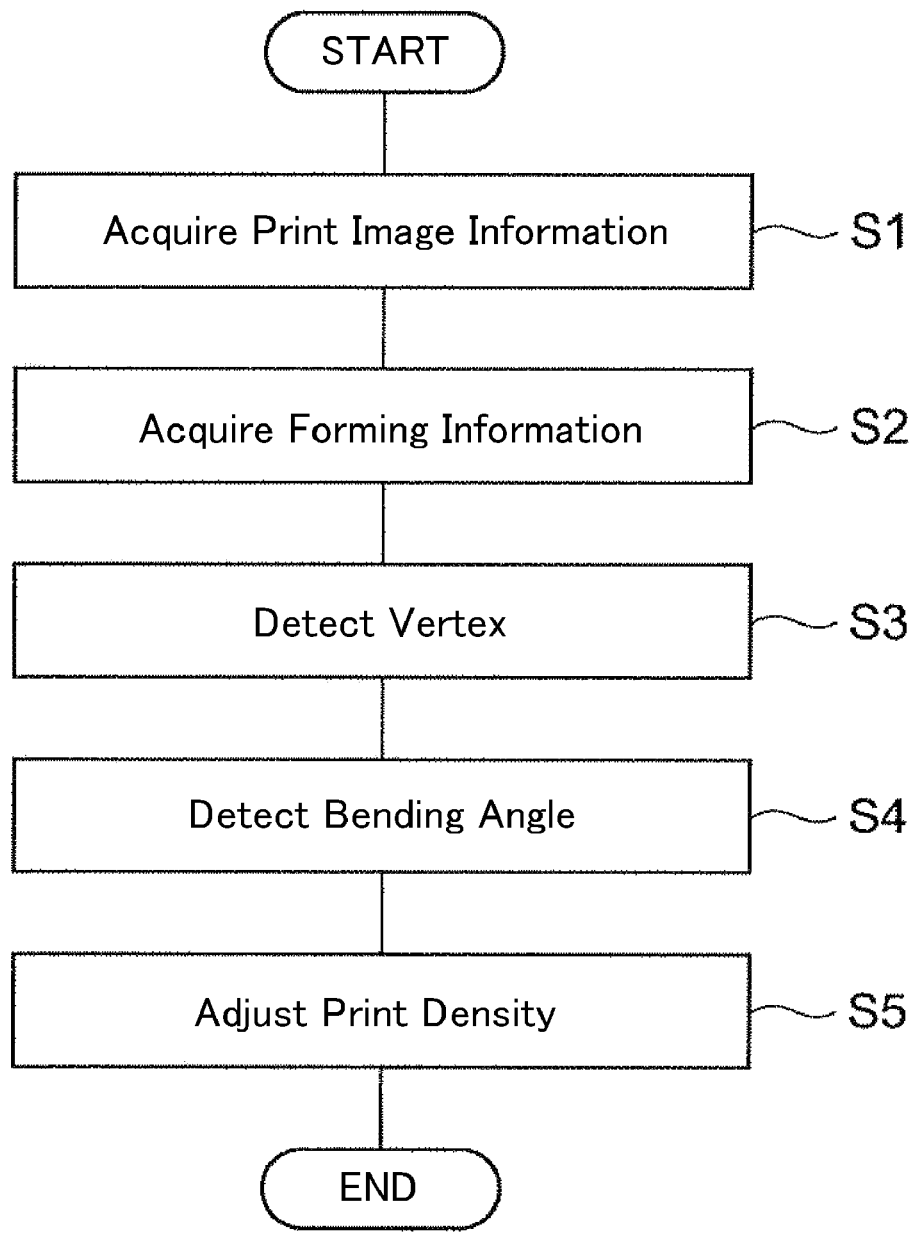
FIG. 7 is a flow chart showing a processing operation of an RIP.

Next, an operation of the RIP 1 in accordance with this embodiment will be described below with reference to FIG. 7. FIG. 7 is a flow chart showing a processing operation of the RIP. In this embodiment, the operation of the RIP 1 described below is executed according to a program recorded in a storage device such as a ROM by means of that a processing part (not shown) structured of CPU or the like integrally manages the functions such as the print image information acquiring part 11, the forming information acquiring part 12, the vertex detecting part 13, the bending angle detecting part 14 and the print density adjusting part 15.

First, the RIP 1 acquires print image information which is transmitted from the CAD application 3 (step S1).

Further, the RIP 1 acquires forming information which is transmitted from the CAD application 3 (step S2).

Next, the RIP 1 detects a bent part "B" of the film "F" based on the forming information which has been acquired in the step S2 to detect a vertex "P" of the bent part "B" (step S3).

Further, the RIP 1 detects a bending angle "α" of the bent part "B" which has been detected in the step S3 based on the forming information which has been acquired in the step S2 (step S4).

Next, the RIP 1 adjusts a print density of the print image information which has been acquired in the step S1 based on the vertex "P" detected in the step S3 and the bending angle "α" detected in the step S4 (step S5). As described above, adjustment of the print density is executed with reference to the print density setting table so that the print density is set lower toward the vertex "P" in the bent part "B" formed in a recessed shape and the print density is set higher toward the vertex "P" in the bent part "B" formed in a projected shape. Further, in the step S5, an ejection density of ink droplets which are to be ejected from the inkjet printer 4 is calculated depending on the print density which has been set, and print data are created by using the calculated result and transmitted to the inkjet printer 4.

In the inkjet printer 4, an ink ejection control is executed based on the print data which have been transmitted from the RIP 1 and ink droplets are ejected on the film "F" to print an image.

Figure 8:
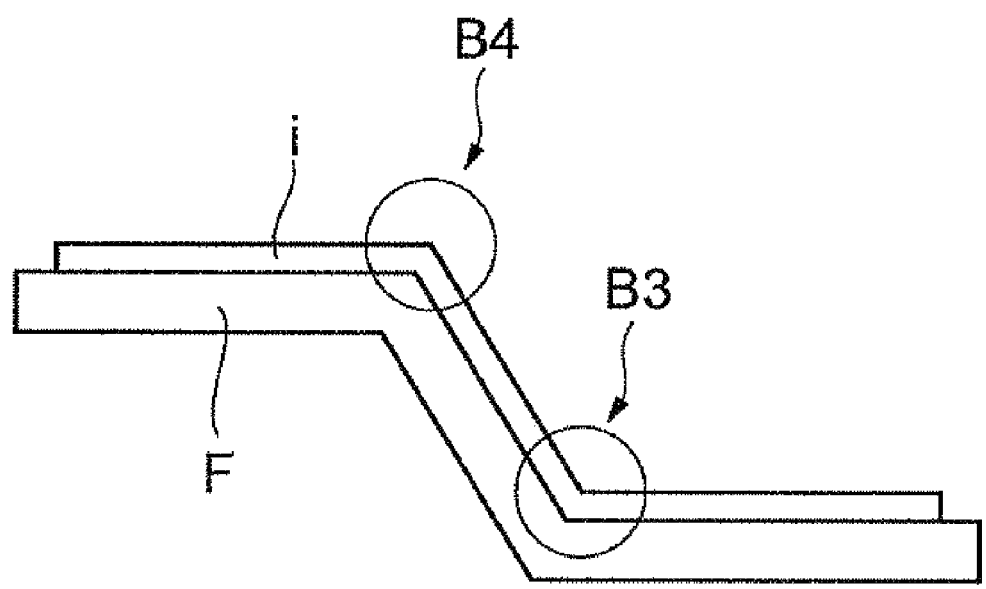
FIG. 8 is a cross-sectional view showing a film which is bent in a projected and recessed shape.
Figure 9:
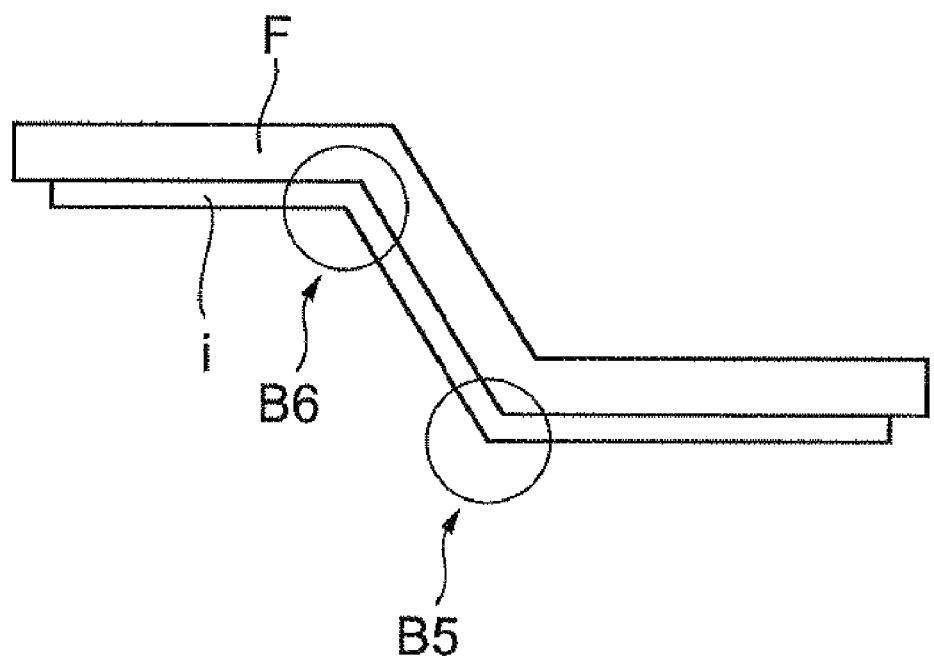
FIG. 9 is a cross-sectional view showing a film which is bent in a projected and recessed shape.

The film "F" on which the image has been printed is bent by a forming equipment not shown in a projected and recessed shape. FIGS. 8 and 9 are cross-sectional views showing films which have been bent in a projected and recessed shape. In the film "F" shown in FIG. 8, an ink layer "i" made of ink droplets which have been ejected from the inkjet printer 4 is formed on a front face of the film "F". Also, the film "F" is formed to be bent from its front face side by the forming equipment and a bent part "B3" formed in a recessed shape and a bent part "B4" formed in a projected shape are formed in the film "F". On the other hand, in the film "F" shown in FIG. 9, an ink layer "i" made of ink droplets which have been ejected from the inkjet printer 4 is formed on a rear face of the film "F". Also, the film "F" is formed to be bent from its front face side by the forming equipment and a bent part "B5" formed in a projected shape and a bent part "B6" formed in a recessed shape are formed in the film "F".

When the film "F" has been bent as described above, as shown in FIG. 1, an operator for the RIP 1 checks quality of the image printed on the film "F". The quality check is especially performed on the quality of the print image around the bent part of the film "F". Specifically, the print images around the bent parts "B3" through "B6" shown in FIGS. 8 and 9 are observed and checked by the operator whether floating or cracking is occurred in the ink layer "i" or not, whether the ink layer "i" is separated from or not, or whether the print density is uniform or not, and so forth. When judged that these check items are not satisfied, the operator changes the respective density set values in the print density setting table which is managed in the RIP 1. When the print density setting table in the RIP 1 has been changed, the processing from the step S1 is repeated again and an image is printed on the film "F".

As described above, according to this embodiment, in addition to the print image information, the forming information for the film "F" is acquired and thus the vertex "P" and the bending angle "α" where the film "F" is to be bent are detected. Therefore, the print image information is adjusted to the optimum print density corresponding to expansion and contraction of the ink layer "i", which will be occurred when the film "F" is bent in a projected and recessed shape, by means of that the print density of the print image information is adjusted based on the vertex "P" and the bending angle "α". In this manner, the quality degradation of the image which is printed on the film "F" to be bent is restrained.

Further, in consideration of that the ink layer "i" is gradually expanded and contracted with the vertex "P" of the bent part "B" as a center, the print density variation around the bent part "B" is gradated by means of that the print density is adjusted depending on the distance from the vertex "P" and thus the print density can be made uniform.

In this case, in consideration of that the ink layer "i" is contracted at the bent part "B" which is formed in a recessed shape, the print density is lowered toward the vertex "P". Therefore, the print density around the bent part "B" can be made uniform by bending of the film "F" in the recessed shape and floating of the ink layer "i" and separation of the ink layer "i" can be restrained.

On the other hand, in consideration of that the ink layer "i" is expanded at the bent part "B" which is formed in a projected shape, the print density is heightened toward the vertex "P". Therefore, the print density around the bent part "B" can be made uniform by bending of the film "F" in the projected shape and cracking of the ink layer "i" can be restrained.

Further, an interval of ink droplets can be varied by changing the ejection density of the ink droplets as the adjuster of the print density. Therefore, even when the film "F" is bent in a projected and recessed shape, interference between the ink droplets can be suppressed to a minimum and destruction of the ink layer "i" due to the interference between the ink droplets can be restrained.

Although the present invention has been shown and described with reference to a specific embodiment, the present invention is not limited to this embodiment. For example, in the embodiment described above, the print density of the print image information is adjusted by referring to the print density management table. However, for example, the print density of the print image information may be adjusted by calculating the optimum print density through a predetermined arithmetic expression.

Further, in the embodiment described above, the quality check of the image which has been printed on the film "F" is performed through observation by an operator. However, for example, the quality check of the image may be performed such that the image printed on the film "F" is image-pickuped by a monitor or the like and density variation or the like of the image having been image-pickuped is analyzed by a computer or the like and, based on the analyzed result, the print density management table or the predetermined arithmetic expression is changed automatically.

The embodiment of the present invention may be applicable to an RIP.

According to the print density adjusting device in accordance with the embodiment of the present invention, a vertex and its bending angle to be bent are detected by acquiring the forming information of a medium in addition to print image information. In addition, since print density of the print image information is adjusted based on the vertex and the bending angle, the print image information can be adjusted to the optimum print density corresponding to expansion and contraction of the ink layer which will be occurred when the medium is bent in a projected and recessed shape. Therefore, the quality degradation of the image which is printed on the medium to be bent is restrained.

In this case, it is preferable that the print density adjuster adjusts the print density of the print image information depending on a distance from the vertex. According to this print density adjusting device, in consideration of that the ink layer is gradually expanded or contracted with the vertex of the bent part as a center, the print density variation around the bent part is gradated by means of that the print density is adjusted depending on the distance from the vertex. Therefore, the print density can be made uniform.

Further, it is preferable that, when the bent part is to be bent in a recessed shape, the print density adjuster sets the print density lower toward the vertex of the bent part. According to this print density adjusting device, in consideration of that the ink layer is contracted at the bent part which is formed in a recessed shape, the print density is lowered toward the vertex. As a result, the print density around the bent part can be made uniform by bending of the medium in the recessed shape and floating of the ink layer and separation of the ink layer can be restrained.

On the other hand, it is preferable that, when the bent part is to be bent in a projected shape, the print density adjuster sets the print density higher toward the vertex of the bent part. According to this print density adjusting device, in consideration of that the ink layer is expanded in the bent part which is formed in a projected shape, the print density is heightened toward the vertex and thus the print density around the bent part can be made uniform by bending of the medium in the projected shape and cracking of the ink layer can be restrained.

Further, it is preferable that the print density adjuster adjusts the print density of the print image information by varying ejection density of ink droplets which are ejected from the inkjet printer. According to this print density adjusting device, an interval of ink droplets is capable of being varied by changing the ejection density of the ink droplets as the adjuster of the print density. Therefore, even when the medium is bent in a projected and recessed shape, interference between the ink droplets can be suppressed to a minimum and thus destruction of the ink layer due to the interference between the ink droplets can be restrained. According to the print density adjusting method in accordance with the embodiment of the present invention, a vertex and its bending angle to be bent are detected by acquiring the forming information of a medium in addition to print image information. In addition, since print density of the print image information is adjusted based on the vertex and the bending angle, the print image information can be adjusted in the optimum print density corresponding to the expansion and contraction of the ink layer which will be occurred when the medium is bent in a projected and recessed shape. In this manner, quality degradation of the image which is printed on the medium to be bent is restrained.

According to the print density adjusting program in accordance with the embodiment of the present invention, a step is provided in which the forming information of a medium is acquired in addition to the print image information and thus a vertex and its bending angle to be bent are detected. In addition, a step is provided in which the print density of the print image information is adjusted based on the vertex and the bending angle and thus the print image information can be adjusted in the optimum print density corresponding to the expansion and contraction of the ink layer which will be occurred when the medium is bent in a projected and recessed shape. In this manner, the quality degradation of the image which is printed on the medium to be bent is restrained.

According to the embodiment of the present invention, the quality degradation of the image which is printed on the medium to be bent is restrained.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A print density adjusting device of print image information, comprising:
    a print image information acquirer configured to acquire the print image information;
    a forming information acquirer configured to acquire forming information of a medium on which an inkjet printer prints and which is to be bent;
    a vertex detector configured to detect a vertex of a bent part which is to be bent based on the forming information;
    a bending angle detector configured to detect a bending angle of the bent part based on the forming information; and
    a print density adjuster configured to adjust a print density of the print image information acquired by the print image information acquirer based on the vertex detected by the vertex detector and based on the bending angle detected by the bending angle detector.

2. The print density adjusting device according to claim 1, wherein the print density adjuster is configured to adjust the print density of the print image information depending on a distance from the vertex.

3. The print density adjusting device according to claim 2, wherein when the bent part is to be bent in a recessed shape, the print density adjuster is configured to make the print density lower toward the vertex of the bent part.

4. The print density adjusting device according to claim 2, wherein when the bent part is to be bent in a projected shape, the print density adjuster is configured to make the print density higher toward the vertex of the bent part.

5. The print density adjusting device according to claim 1, wherein the print density adjuster is configured to vary an ejection density of ink droplets which are ejected from the inkjet printer to adjust the print density of the print image information.

6. A print density adjusting method of print image information, comprising:
    acquiring the print image information;
    acquiring forming information of a medium on which an inkjet printer is to print and which is to be bent;
    detecting a vertex of a bent part which is to be bent based on the forming information;
    detecting a bending angle of the bent part based on the forming information; and
    adjusting a print density of the print image information acquired in the print image information acquiring step based on the vertex detected in the vertex detecting step and based on the bending angle detected in the bending angle detecting step.

7. A print density adjusting program of print image information, the print density adjusting program causing a computer to perform:
- acquiring the print image information;
- acquiring forming information of a medium on which an inkjet printer prints and which is to be bent;
- detecting a vertex of a bent part which is to be bent based on the forming information;
- detecting a bending angle of the bent part based on the forming information; and
- adjusting a print density of the print image information acquired in the print image information acquiring step based on the vertex detected in the vertex detecting step and based on the bending angle detected in the bending angle detecting step.

8. The print density adjusting device according to claim 2, wherein the print density adjuster is configured to vary an ejection density of ink droplets which are ejected from the inkjet printer to adjust the print density of the print image information.

9. The print density adjusting device according to claim 3, wherein the print density adjuster is configured to vary an ejection density of ink droplets which are ejected from the inkjet printer to adjust the print density of the print image information.

10. The print density adjusting device according to claim 4, wherein the print density adjuster is configured to vary an ejection density of ink droplets which are ejected from the inkjet printer to adjust the print density of the print image information.

11. A print density adjusting device of print image information, the print density adjusting device comprising:
- print image information acquiring means for acquiring the print image information;
- forming information acquiring means for acquiring forming information of a medium on which an inkjet printer prints and which is to be bent;
- vertex detecting means for detecting a vertex of a bent part which is to be bent based on the forming information;
- bending angle detecting means for detecting a bending angle of the bent part based on the forming information; and
- print density adjusting means for adjusting a print density of the print image information acquired by the print image information acquiring means based on the vertex detected by the vertex detecting means and based on the bending angle detected by the bending angle detecting means.

* * * * *